United States Patent [19]

Ivarson

[11] Patent Number: 5,300,317
[45] Date of Patent: Apr. 5, 1994

[54] PROCESS FOR COVERING SOLID PARTICLES IN POWDER FORM WITH A MATERIAL WHICH IS SOLID OR OF HIGH VISCOSITY AT ROOM TEMPERATURE

[75] Inventor: Nemo S. M. Ivarson, Enskede, Sweden

[73] Assignee: Nemo Ivarson AB, Enskeda, Sweden

[21] Appl. No.: 850,269

[22] Filed: Mar. 12, 1992

[51] Int. Cl.$^5$ .............................................. B05D 7/00
[52] U.S. Cl. ....................................... 427/195; 427/212; 427/221; 427/222; 427/240; 118/52; 264/114
[58] Field of Search ............... 427/180, 184, 212, 221, 427/222, 240, 241, 195; 118/52, DIG. 16; 264/114

[56] References Cited

U.S. PATENT DOCUMENTS

| | | | |
|---|---|---|---|
| 4,690,834 | 9/1987 | Appelgren | 427/212 |
| 4,935,246 | 6/1990 | Ahrens | 427/212 |
| 5,061,520 | 10/1991 | Hermelin | 427/240 |

FOREIGN PATENT DOCUMENTS

| | | |
|---|---|---|
| 0362168 | 4/1990 | European Pat. Off. . |
| 0298355 | 11/1990 | European Pat. Off. . |
| 0305356 | 6/1991 | European Pat. Off. . |
| 455672 | 8/1988 | Sweden . |

*Primary Examiner*—Terry J. Owens
*Attorney, Agent, or Firm*—Young & Thompson

[57] ABSTRACT

A process for coating solid particles in powder form with a material which is solid or of high viscosity at room temperature. A device for carrying out the process comprises a housing (1) with a conical surface (16) and a rotor (7) mounted in the housing and provided with a conical surface (9). The housing has an inlet (20) through which a melt of the solid material can be supplied to a gap between the conical surfaces of the housing and the rotor and an inlet (12) for supplying powder material to the top surface (8a) of the rotor. As the rotor rotates, a film is formed on the conical surface of the housing and at the same time powder is slung, with the aid of vanes (10) on the rotor against the film. The material is worked and pressed out through an outlet (30) by wings (11) on the rotor.

1 Claim, 1 Drawing Sheet

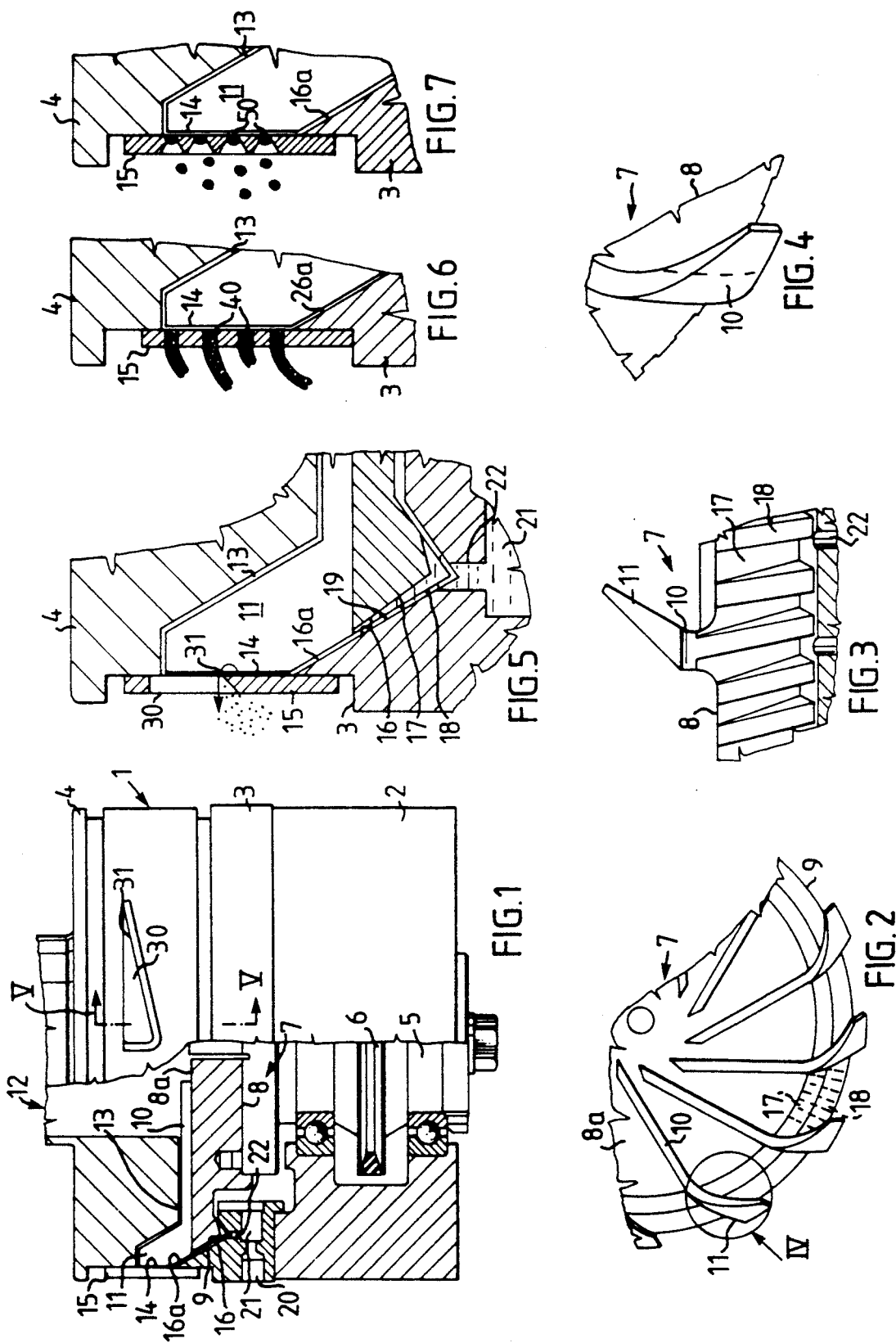

PROCESS FOR COVERING SOLID PARTICLES IN POWDER FORM WITH A MATERIAL WHICH IS SOLID OR OF HIGH VISCOSITY AT ROOM TEMPERATURE

FIELD OF THE INVENTION

The present invention relates to a process for coating solid particles in powder form with a material which is solid or of high viscosity at room temperature, whereby the powder material is supplied to a central area on a rotating mixing wheel and is slung radially outwards against a surrounding wall of a mixing housing.

THE PRIOR ART

In a process known by Swedish lay-open print 455 672 of the type described above, the solid material is supplied in molten form to a separate cavity in the mixing wheel, the molten material is pressed radially outwards through a slot in the mixing wheel towards the top-side of the wheel where, in the form of droplets, is struck by the powder material which is slung radially outwards, the powder particles thus being coated by the molten material. With the help of blades on the outer periphery of the mixing wheel, the material is then transported peripherally to an outlet.

In order to carry out the process described, the use of a mixing device is suggested which was originally developed to provide homogeneous wetting of powder. It was found however that when using this mixing device the final product had a tendancy to agglomerate and stick to the blades of the mixing wheel. For certain material this has resulted in stoppage after a few tenths of a second.

SUMMARY OF THE INVENTION

The purpose of the present invention is to develop a process of the type described by way of introduction so that stoppage for this reason cannot occur.

This is achieved according to the invention by virtue of the fact that the powder material and the material which is solid or of high viscosity at room temperature is inparted a rotary movement against an annular conical wall and that the material mixture, while being worked against the conical wall under the influence of centrifugal force, is allowed to move axially in the direction in which the conical wall widens, towards an outlet in the housing.

It is been found that the kneading of the material which occurs against the conical wall during the time it takes for the material to be fed up to the outlet, contributes to increasing the temperature of the material, thus making it possible to achieve a controlled melt-granulation process without the risk of stoppage.

A specially designed mixing device for continuous mixing of powder and liquid which is shown and described in Swedish lay-open print 462 018 has proved to give excellent results when used for carrying out the process according to the present invention.

Trials were carried out using the present invention to coat a material, microcellulose, with wax (a difficult material combination which caused stoppage within a few tenths of a second in the known mixing process) and such a heating of the wax was obtained that it could even be added in powder form. The kneading against the conical wall was thus sufficient to provide the rise in temperature required to melt wax.

BRIEF DESCRIPTION OF THE DRAWINGS

The invention will be described in more detail below with reference to examples shown in the accompanying drawings, where FIG. 1 shows a partially sectioned sideview of a mixing device which can be used to carry out the process according to the invention, FIG. 2 shows a planview of a portionally rotor, FIG. 3 shows a sideview of a portionally rotor, FIG. 4 shows an enlargement of the circle are in FIG. 2, FIG. 5 shows a section along the line IV—IV in FIG. 1 on a larger scale, FIG. 6 is a view corresponding to FIG. 5 of a second modified embodiment, and FIG. 7 shows a design having an outlet in the form of a conical perforation.

DETAILED DESCRIPTION OF THE PREFERRED EMBODIMENTS

The mixing device shown in FIG. 1 comprises a housing, generally designated 1, consisting of a lower portion 2, an intermediate portion 3 and a cover 4, which are coupled together by means of screws (not shown) in the lower portion 2 a shaft 5 with a drive disk 6 is rotatably mounted. The shaft 5 supports a rotor with a general designation 7, comprising a disk 8 with a conical lateral surface 9.

Vanes 10 are disposed on a topside 8a of the disk 8 and extend from a central area on the rotor obliquely backwards (relative to the rotational direction of the rotor) and outwards to the peripheral edge of the rotor disk 8. The vanes are disposed perpendicular to the topside of the disk 8 and at their radially outward end portions are extended outwards to form wings 11 which are bent backwards (relative to the rotational direction) from the vanes 10 proper.

The cover 4 has a central inlet 12 for the powder material and is shaped so that only a narrow slot is formed between the upper surfaces of the vanes 10 and the wings 11 and the cover. Furthermore the space about the rotor is limited by a cylindrical wall 14 of an annular element 15 and a conical wall 16 in the intermediate portion 3 of the housing. The conical wall 16 has a portion 16a which extends above the upper surface 8a of the rotor. The rotor surface 9 is provided with grooves 17 (see FIG. 3) which becomes narrower in the upwards direction. The inclination of the conical wall 16 agrees with the inclination of the surface portions 18 between the grooves 17 of the rotor and the components are arranged so that in practice a gap 19 (FIG. 5) on the order of magnitude of 1 millimeter is formed between them.

The intermediate portion 3 of the housing has an inlet 20 which opens into an annular channel 21 from which peripherally spaced bores 22 lead into the gap 19. Eere, the solid material in molten form can be introduced. The melt which is guided into the gap 19 is spread around by the rotor as it rotates, and a particularly effective spreading effect is achieved by virtue of the special surface structure of the rotor, i.e. the grooves 17. Centrifugal force presses the melt through the gap 19 and up onto the conical surface 16a, where it forms a thin rotating film. The powder, which is fed in through the inlet 12 from a conveyor (not shown) and lands on the central area of the disk is slung outwards by the vanes 10 and strikes the film on the conical surface 16a. The vertical component of the centrifugal force striking the inclined surface 16a drives the mixture of melt and powder upwards against the cylindrical wall 14. Under the influence of the inclined wings 11, the mixture is forced upwards further at the same time as it is kneaded and spread out against the cylindrical wall 14 of the ring 15. Depending on the type of solid material which the powder material is to be coated with, the solid material can also be supplied in powder form through the central inlet 12 mixed with the first powder material. Wax can for example be supplied in this manner.

Depending on which final product is desired, the ring can be made with various outlets. FIGS. 1 and 5 show a design in which the ring is provided with a triangular slot 30, the lower edge of which has been filed to a sharp edge 31. When the mixture is driven circumferentially and pressed against the wall 14 by the wings 11, a "wake" is formed behind the wings and when this wake breaks against the sharp edge 31 a granulate is formed consisting of relatively small and irregular granules. FIG. 6 show a design in which the ring 14 has an outlet 40 in the form of relatively large cylindrical perforations. The final product in this case will be an extrusion. Finally, FIG. 7 shows a design in which the ring 14 has an outlet in the form of conical perforation 50, which provide a granulate with larger and more regular granules than the design according to FIG. 5. If the final product is to be a dough or slurry, the ring can be provided with a large cylindrical opening, possibly provided with a nozzle.

The ring 15 is fixed to the intermediate portion 3 and/or the cover 4 in such a manner, for example by friction, that it can be easily disassembled thus making it possible to use a single mixer for producing a number of different final products merely by interchanging rings with various outlets. The rings 15 can also be set at various vertical positions relative to the conical surface 16a to provide a change in the distance between the conical surface 16a and the outlet to thereby vary the distance and thus the time during which the mixture is worked by the wings 11.

Even though it has been demonstrated that a rotor 7 with a lateral surface with upwardly narrowing grooves 17 has provided excellent results, it is within the scope of the invention also possible to provide a well-functioning device with another surface structure on the lateral surface of the rotor. The most important feature here is that the surface is a frictional surface which pulls the material with it so that it is imparted a rotary movement.

I claim:

1. A process for coating solid particles in powder form with a material which is solid or highly viscous at room temperature, comprising supplying said solid particles in powder form to a central area of a rotating mixing wheel, slinging the particles radially outwardly against a stationary surrounding annular wall of a mixing housing by centrifugal force imparted to the particles by said rotating mixing wheel, said wall widening in one axial direction, supplying said material in powder form to said mixing housing, and kneading said particles and said material against said wall by vanes on said mixing wheel whereby a mixture of said particles and said material is formed and said mixture is impelled along said wall in a direction which has a component in said one axial direction.

* * * * *